United States Patent [19]

Ellermann et al.

[11] Patent Number: 4,599,935
[45] Date of Patent: Jul. 15, 1986

[54] PLUNGER PISTON FOR INTERNAL COMBUSTION ENGINES

[75] Inventors: Jürgen Ellermann, Winnenden; Horst Pfeiffenberger, Fellbach, both of Fed. Rep. of Germany

[73] Assignee: Mahle GmbH

[21] Appl. No.: 662,094

[22] Filed: Oct. 18, 1984

[30] Foreign Application Priority Data

Oct. 22, 1983 [DE] Fed. Rep. of Germany ....... 3338474

[51] Int. Cl.$^4$ .............................................. F01M 1/04
[52] U.S. Cl. ........................................ 92/159; 92/208
[58] Field of Search .................. 92/159, 158, DIG. 2, 92/181 R, 174, 208; 308/3 R; 123/193 P

[56] References Cited

U.S. PATENT DOCUMENTS

| | | | |
|---|---|---|---|
| 1,760,122 | 5/1930 | Dreuitson | 92/158 |
| 2,381,065 | 8/1945 | Lieberherr | 92/158 |
| 2,407,440 | 9/1946 | Osborne | 92/159 |
| 3,515,035 | 6/1970 | Fletcher | 92/159 |
| 4,535,682 | 8/1985 | Collyear et al. | 92/158 X |

Primary Examiner—Robert E. Garrett
Assistant Examiner—Mark A. Williamson
Attorney, Agent, or Firm—James C. Wray

[57] ABSTRACT

A piston for internal combustion engines, which has inclined surface portions in the skirt area to allow formation of hydrodynamic wedges of lubricant, these surface portions being constructed as skirt recesses (13 or 14) which are open either towards the upper or towards the lower end of the piston skirt. The transition zone from these skirt recesses to the bearing surface of the working surface of the piston is constituted by oblique surfaces which are inclined inwardly from the surface of the skirt. The oblique surfaces terminate in a circumferential direction within the bearing surfaces of the piston. The oblique surfaces constitute ramps on which a hydrodynamic wedge of lubricacting oil can form. The particular advantage of disposing the oblique surfaces in skirt depressions which are only open at one end lies in that when the hydrodynamic wedge of lubricating oil builds up as a result of the translatory motion of the piston, the oil which forms the wedge of lubricant cannot escape in a peripheral direction which thereby increases the frictional quality (or aqua-planing effect) between the working surfaces of the piston and cylinder.

12 Claims, 2 Drawing Figures

PLUNGER PISTON FOR INTERNAL COMBUSTION ENGINES

BACKGROUND TO THE INVENTION

The invention relates to a plunger piston for internal combustion engines having a piston head, a cylindrical skirt connected at one end to said head, and two gudgeon pin bosses having bores located on a common axis and extending radially inwards from said skirt, said skirt having within a cylindrical generatrix circumferentially extending thrust and antithrust bearing surfaces disposed between the gudgeon pin bosses.

STATEMENT OF PRIOR ART

Such pistons are known for example from WO No. 80/00738 A1. The object of this known type of piston is to minimize friction of the piston on the cylinder liner when the engine is running. For this purpose, the known piston is provided in its skirt region with individual inclined annular surfaces on which it is intended hydrodynamic wedges of lubricating oil should form in a similar manner to the well-known principle of aqua-planing.

In pursuance of the same object, in the case of a piston having individual bearing surface areas which project from the piston skirt, according to DE No. 32 28 982 A1, the transition between the projecting surfaces and the other part of the skirt is constructed as an obliquely extending ramp. It is likewise intended that the above-described wedge of lubricating oil should form on these ramps so that the piston is guided on a film of oil on the projecting areas on the bearing surface.

To damp tilting movements on the part of plunger pistons, it has already been proposed in DE No. 30 22 858 A1 to provide, on the bearing sides of the piston skirt and extending along the piston axis, zones of increased clearance between piston skirt and cylinder liner. These zones which have increased clearance run out in each case towards the upper and lower ends of the piston skirt. It is intended thereby that zones of the very narrowest clearance which extend on the rim of the bearing zones of the piston skirt should provide for damping in that the lubricating oil has to flow through restricting gap zones which have a damping effect.

A piston skirt construction which is comparable in its principle is already disclosed in U.S. Pat. No. 3,058,792. In this patent, the piston skirt comprises a restricting gap extending parallel with the piston axis but at least not directly on the edges of the bearing sides of the piston skirt, but at the end of the gudgeon pin. The damping action does however have the same effect which in turn resides in lubricating oil requiring to be forced through a narrow restricting gap when the piston tips.

OBJECT OF THE INVENTION

In view of the aforedescribed state of the art, the object of the present invention is to diminish the noise caused by the tilting motion of the piston (so-called piston-slap) and at the same time to reduce friction between piston skirt and cylinder liner. On this premise, the invention is based on the problem to develop for greater efficiency the per se known measures aimed at creating hydrodynamic lubricating wedges on the surface of the piston skirt.

According to the invention there is provided a piston for internal combustion engines having a piston for internal combustion engines having a piston head, a cylindrical skirt connected at one end to said head, and two gudgeon pin bosses having bores located on a common axis and extending radially inwards from said skirt, said skirt having within a cylindrical generatrix circumferentially extending thrust and antithrust bearing surfaces disposed between the gudgeon pin bosses, the improvement comprising the provision of a recess formed in at least one of said thrust and antithrust bearing surfaces, said recess being positioned remote from the piston head end of the skirt, which recess extends circumferentially around the skirt and terminates circumferentially within the zone of said bearing surface and which is open at one end only in a direction away from the piston head end of the skirt entirely across the circumferential extension of the recess and is closed at an opposite end remote from said one end by a surface which is inclined towards the longitudinal axis of the piston away from said cylindrical generatrix to form therewith a wedge having its wider end disposed nearest the end remote from the head end of the skirt, whereby when said piston is reciprocating within a cylinder, a hydrodynamic wedge of lubricating oil is created between the skirt and the cylinder walls within the recess thereby serving to guide the piston.

Preferably, a second inclined surface which is part annular is formed in said at least one bearing surface, said second part annular surface being positioned towards the piston head end of the skirt and being inclined towards the longitudinal axis of the piston away from said cylindrical generatrix containing the bearing surface to form with said generatrix a wedge having its wider end disposed nearest the piston head end of the skirt, said second inclined surface being a surface of a second recess formed in said at least one bearing surface, which recess extends circumferentially and terminates circumferentially within the zone of said bearing surface, whereby when said piston is reciprocating within a cylinder, a hydrodynamic wedge of lubricating oil is created between the skirt and the cylinder walls within the recess thereby serving to guide the piston.

Essentially the thrust bearing surface is provided with a recess at the end of the skirt remote from the piston head. However, it is preferable that the thrust bearing surface should be formed with two recesses which have said first and second inclined surfaces respectively. Two recesses identical to the two recesses in the thrust bearing surface may also be provided in the anti-thrust bearing surface.

The improved effect is, in the case of an embodiment of piston skirt according to the invention, achieved in that the inclined part annular surfaces do not encircle the entire periphery of the piston skirt, as for example in WO No. 80/00738, but only limited zones in which they are confined in a circumferential direction. As a result, the formation of a hydrodynamic wedge of lubricating oil produced similar to the aqua-planing effect is improved in that during the pressure build-up phase, the lubricating oil on the inclined surface cannot escape in a circumferential direction. In theory, even with an encircling inclined annular face, such escape would not be possible if the piston were not to undergo any variations in running clearance along its skirt periphery during its stroke, due to tilting of the piston. In practice, however, this is not the case so that oil can always flow out in a circumferential direction into adjacent zones where the clearance begins to increase. For the remainder, there will always be forced movement in a circumferential direction if the inclined annular face is interrupted at any point around the periphery of the piston skirt without measures being provided at these points to reduce the gap between the inclined face and the cylinder liner.

Although the skirt recesses may be provided both at the upper and lower ends of the skirt, greater significance is attributed to the skirt recess which is at the lower end of the skirt.

Although it is particularly important according to the invention for the marginal zones of the skirt recesses which extend in the direction of travel to have inclined surfaces, it is recommended that also the marginal zones of the skirt recesses which lie in the circumferential direction of the skirt should also be provided with such inclined linear surfaces or, in other words, with inclined ramps such as are necessary to create a hydrodynamic wedge of lubricating oil also in the circumferential direction of the piston skirt.

The skirt recesses are particularly effective if they are in each case disposed in the areas of the bearing surface of the piston skirt which are around the line of intersection of the tilting plane with the piston skirt generatrix.

Where the skirt recesses are of considerable height along the piston axis, it is sufficient if only the marginal zones are constructed substantially in the form of an encircling strip having faces which are inwardly inclined in relation to a cylindrical generatrix. These strips may be also termed as an inclined encircling ramp. Within the ramp area, all that is important with regard to the shaping of the skirt recess is that this zone should not be located higher, at least radially outwardly, than the lowest inwardly directed portion of the encircling ramp.

BRIEF DESCRIPTION OF DRAWINGS

An embodiment will now be described by way of example with reference to the accompnaying drawings in which.

DESCRIPTION OF PREFERRED EMBODIMENTS

Figure 1:
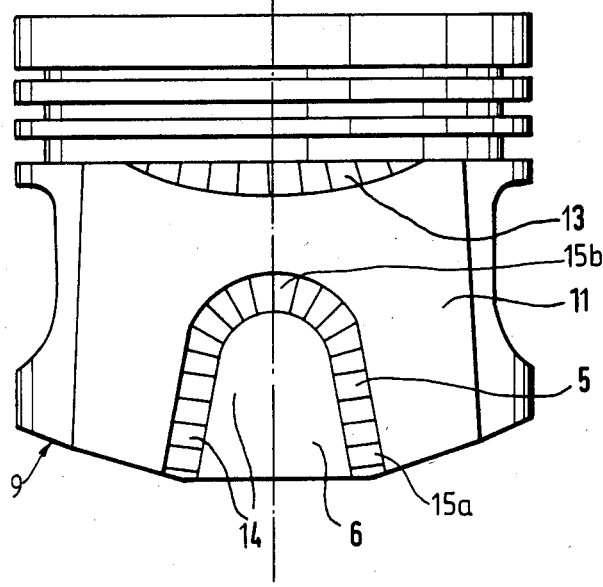
FIG. 1 is a view of the piston in a direction at right-angles to the gudgeon pin axis.
Figure 2:
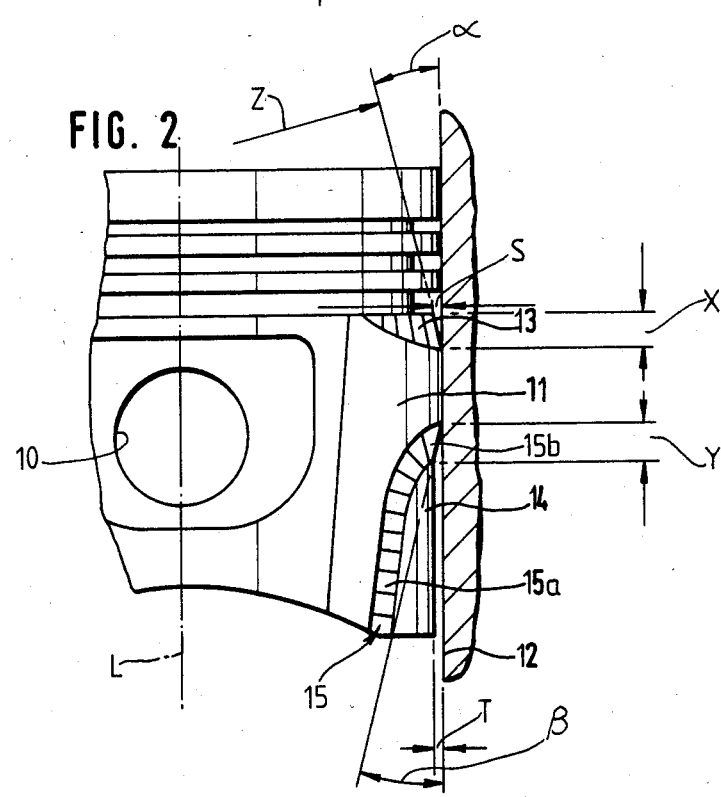
FIG. 2 is a detail from a part elevation of the piston in the direction of the gudgeon pin axis together with part section of the adjacent cylinder.

The piston shown in the figures comprises a piston head, a skirt 9, and gudgeon pin bosses 10 extending radially inwardly from said skirt 9, said bosses having bores positioned on a common axis.

The skirt of the piston is of a shape where the skirt is guided on the liner of the cylinder 12 only over the working surface zone 11 which comprises thrust and anti-thrust bearing surfaces disposed between the gudgeon pin bosses and within a cylindrical generatrix. At the upper and lower ends of the skirt 9 there are respective upper and lower skirt recesses 13 and 14. Whereas in the case of the upper skirt recess 13 the entire zone is constituted by an inclined portion of part annular surface, only the marginal zone of the lower recess 14 has surfaces adjacent the working surface zone 11 is constituted by two elongated substantially linear surfaces 15a inclined inwardly of the skirt in directions away from the adjacent zone 11 and an arcuate portion 15b also inclined inwardly in a direction away from the adjacent zone 11. The area of the skirt recess 14 which lies in the centre 6 is on the other hand just set back cylindrically from the working surface zone 11. The inclined arcuate surface and the inclined marginal zone of the recesses 13 and 14 respectively are shown as shaded in the drawing to improve clarity of illustration. The central region 6 of the recess 14 can, to reduce the piston weight, be in many cases entirely recessed from the piston skirt, i.e. so that the piston skirt is apertured in the central region 6.

The part annular surface of the recess 13 is positioned at the piston head end of the skirt and is inclined to the longitudinal axis (L) of the piston by an angle $\alpha$ of from 10 to 90 minutes away from the cylindrical generatrix containing the bearing surface to form with said generatrix a wedge having its wider end disposed nearest the piston head end of the skirt.

It can be seen from the figures that the recess 13 extends circumferentially and terminates circumferentially within the zone of the bearing surface. Thus the recess 13 is only open in an axial direction.

Preferably the part annular surface has a dimension (X) which may be 5 mm for a piston having a diameter 90 mm. The upper part annular surface extends over the entire axial dimension of the recess radially to a maximum depth (S) of from 25 to 125$\mu$ from the cylindrical generatrix.

The radius Z is chosen to ensure that the recess falls within the circumferential extent of the bearing surface.

The arcuate surface 15b of the recess 14 is positioned towards the opposite end of the skirt remote from the piston head and is inclined to the longitudinal axis L by an angle $\beta$ of from 10 to 90 minutes away from the cylindrical generatrix to form with said generatrix a wedge having its wider end disposed nearest said opposite end.

In similar manner to the arcuate surface of the recess 13, the arcuate surface 15b terminates circumferentially within the bearing surface although the ends of the arcuate surface 15b are contiguous with two inclined rectilinear surfaces 15a.

Preferably the arcuate surface 15b has a dimension (Y) in the axial direction at the apex of the recess 14 of about 5 mm for a 90 mm diameter piston and a maximum radial depth T from 25 to 125$\mu$.

Both recesses 13,14 are disposed symmetrically about a plane through the central longitudinal axis of the piston disposed at right angles to the plane containing the longitudinal axis and the axis of the gudgeon pin bores.

The hydrodynamic wedge of lubricating oil which is desired according to the invention can be produced in a substantially more effective manner on the inclined faces of the peripherally closed recesses 13 and 14 than would be possible with peripherally open inclined annular faces since the oil cannot readily escape circumferentially from the recesses. It is in this factor that the objects of the piston construction according to the invention are achieved.

We claim:

1. In a piston for internal combustion engines having a piston head, a cylindrical skirt connected at one end to said head, and two gudgeon pin bosses having bores located on a common axis and extending radially inwards from said skirt, said skirt having within a cylindrical generatrix circumferentially extending thrust and anti-thrust bearing surfaces disposed between the gudgeon pin bosses, the improvement comprising the provision of a recess formed in at least one of said thrust and anti-thrust bearing surfaces, said recess being positioned remote from the piston head end of the skirt, which recess extends circumferentially around the skirt and terminates circumferentially within the zone of said bearing surface and which is open at one end only in a direction away from the piston head end of the skirt entirely across the circumferential extension of the recess and is closed at an opposite end remote from said one end by a surface which is inclined towards the longitudinal axis of the piston away from said cylindrical generatrix to form therewith a wedge having its wider end disposed nearest the end remote from the head end of the skirt, whereby when said piston is reciprocating within a cylinder, a hydrodynamic wedge of lubricating oil is created between the skirt and the cylinder walls within the recess thereby serving to guide the piston.

2. A piston as claimed in claim, 1 wherein the first inclined surface of the recess has an axial dimension of at least 5 mm at a central region thereof.

3. A piston according to claim 1, wherein said recess also includes two inclined substantially rectilinear surfaces contiguous with the ends of the first inclined surface, said substantially rectilinear surfaces terminating in the end of the skirt remote from the piston head.

4. A piston according to claim 3, wherein the piston skirt is entirely recessed in the region bounded by the first inclined surface and the two substantially rectilinear surfaces.

5. A piston according to claim 1, wherein said inclined surface is arcuate and has the summit of its arc extending towards the piston head end of the skirt.

6. A piston according to claim 1 or 5, including a second inclined surface which is part annular formed in said at least one bearing surface, said second inclined surface being positioned towards the piston head end of the skirt and being inclined towards the longitudinal axis of the piston away from said cylindrical generatrix containing the bearing surface to form with said generatrix a wedge having its wider end disposed nearest the piston head end of the skirt, said second inclined surface being a surface of a second recess formed in said at least one bearing surface, which second recess extends circumferentially and terminates circumferentially within the zone of said bearing surface, whereby when said piston is reciprocating within a cylinder, a hydrodynamic wedge of lubricating oil is created between the skirt and the cylinder walls within the second recess thereby serving to guide the piston.

7. A piston according to claim 6, wherein said second inclined surface extends over the entire axial dimension of the recess.

8. A piston according to claim 6, wherein the second inclined surface extends axially a distance of at least 5 mm at a central region thereof.

9. A piston according to claim 6, wherein the inclined surfaces of the recesses are each inclined from 10 to 90 minutes in relation to said cylindrical generatrix.

10. A piston according to claim 6, wherein the inclined surfaces of the recesses have a maximum radial depth of from 25 to 125μ.

11. A piston according to claim 6, wherein the floor of the recess of which said first inclined surface forms part extends substantially cylindrically.

12. A piston according to claim 6, wherein the recesses are disposed respectively in areas in which the generatrix of the piston skirt intersects a plane containing the longitudinal axis of the piston and the common axis of the gudgeon pin bores.

* * * * *